US012152885B1

(12) United States Patent
Moore et al.

(10) Patent No.: US 12,152,885 B1
(45) Date of Patent: Nov. 26, 2024

(54) GEOPHYSICAL FIELD SENSING-BASED NAVIGATION

(71) Applicant: SB Technology, Inc., Tarrytown, NY (US)

(72) Inventors: Kimberly Margaret Moore, Redwood City, CA (US); Regupathi Angappan, Baltimore, MD (US); Alexander James McNeil, Kalispell, MT (US)

(73) Assignee: SB Technology, Inc., Tarrytown, NY (US)

( * ) Notice: Subject to any disclaimer, the term of this patent is extended or adjusted under 35 U.S.C. 154(b) by 0 days.

(21) Appl. No.: 18/544,329

(22) Filed: Dec. 18, 2023

(51) Int. Cl.
G01C 21/20 (2006.01)
G01C 21/08 (2006.01)

(52) U.S. Cl.
CPC ............ *G01C 21/20* (2013.01); *G01C 21/08* (2013.01)

(58) Field of Classification Search
CPC ................................ G01C 21/20; G01C 21/08
See application file for complete search history.

(56) References Cited

U.S. PATENT DOCUMENTS

| 8,311,767 B1* | 11/2012 | Stetson | G01C 17/00 702/152 |
| 2010/0198494 A1* | 8/2010 | Chao | G01C 21/34 701/532 |
| 2016/0109233 A1* | 4/2016 | Morrison | G01C 9/005 701/4 |
| 2017/0010618 A1* | 1/2017 | Shashua | B60W 30/10 |
| 2017/0074660 A1* | 3/2017 | Gann | B64D 43/00 |
| 2021/0375145 A1* | 12/2021 | Wissler | G01S 19/15 |
| 2023/0139622 A1* | 5/2023 | Srivastava | G01C 17/38 356/623 |

FOREIGN PATENT DOCUMENTS

| CN | 108955669 A | * 12/2018 |
| RU | 2530778 C2 | * 10/2014 |

OTHER PUBLICATIONS

Andreeva et al., "Empirical Modeling of the Geomagnetosphere for SIR and CME-Driven Magnetic Storms," JGR Space Physics, Jul. 30, 2019, 22 pages.
Finlay et al., "The CHAOS-7 geomagnetic field model and observed changes in the South Atlantic Anomaly," Earth, Planets and Space, Oct. 20, 2020, 31 pages.

(Continued)

*Primary Examiner* — Hunter B Lonsberry
*Assistant Examiner* — Henry R Hinton
(74) *Attorney, Agent, or Firm* — Fish & Richardson P.C.

(57) ABSTRACT

Example computer-implemented methods and systems for estimating geophysical fields for magnetic navigation. One example computer-implemented method includes storing, at a navigation object, an offline baseline estimation model. Online geophysical field model data not stored on the navigation object are received at various times at the navigation object. Control logic is used to select at least one of (1) the offline baseline estimation model and (2) the online geophysical field model data to use to estimate geophysical fields for the navigation object at a variety of specified times.

20 Claims, 5 Drawing Sheets

(56) References Cited

OTHER PUBLICATIONS gemsy.ca [online], "GEM Magnetometer Base Station Solutions," available on or before Oct. 5, 2018, via Internet Archive: Wayback Machine URL <https://web.archive.org/web/20220101000000*/https://www.gemsys.ca/base-station-solutions/>, retrieved on Jan. 3, 2024, URL <https://www.gemsys.ca/base-station-solutions/>, 4 pages.

Merkin et al., "Effects of the low-latitude ionospheric boundary condition the global magnetosphere," Journal of Geophysical Research, Oct. 2, 2010, 15 pages.

nasa.gov [online], "OMNIWeb Data Documentation," available on or before Nov. 18, 2005, via Internet Archive: Wayback Machine URL <https://web.archive.org/web/20220101000000*/https://omniweb.gsfc.nasa.gov/html/ow_data.html#2>, retrieved on Jan. 3, 2024, URL <https://omniweb.gsfc.nasa.gov/html/ow_data.html#2>, 17 pages.

noaa.gov [online],"HGDM geomagnetic field model (HDGM)," available on or before Dec. 9, 2022, via Internet Archive: Wayback Machine URL <https://web.archive.org/web/20220101000000*/https://www.ncei.noaa.gov/products/high-definition-geomagnetic-model>, retrieved on Jan. 3, 2024, URL<https://www.ncei.noaa.gov/products/high-definition-geomagnetic-model>, 4 pages.

noaa.gov [online], "space weather prediction center," available on or before Mar. 8, 2007, via Internet Archive: Wayback Machine URL <https://web.archive.org/web/20220101000000*/https://www.swpc.noaa.gov/>, retrieved on Jan. 3, 2024, URL <https://www.swpc.noaa.gov/>, 4 pages.

Sabaka et al., "CM6: a comprehensive geomagnetic field model derived from both CHAMP and Swarm satellite observations," Earth, Planets and Space, Jun. 5, 2020, 24 pages.

Wang et al., "Initial results from the coupled magnetosphere-ionosphere-thermosphere model: thermosphere-ionosphere responses," Journal of atmospheric and solar-terrestrial physics, Oct. 1, 2004, 66(15-16):1425-41.

Wiltberger et al., "Initial results from the coupled magnetosphere ionosphere thermosphere model: Magnetospheric and ionospheric responses," Journal of Atmospheric and Solar-Terrestrial Physics, Oct. 1, 2004, 66(15-16):1411-23.

* cited by examiner

GEOPHYSICAL FIELD SENSING-BASED NAVIGATION

TECHNICAL FIELD

The present disclosure relates to computer-implemented methods and systems for geophysical fields sensing-based navigation.

BACKGROUND

In regions where Global Positioning System (GPS) based navigation is degraded (e.g. urban areas), denied, or unavailable (e.g. underwater), alternative position, navigation, and/or timing (alt-PNT) technologies can be used to support navigation. Magnetic Navigation (MagNav) is a technique to provide position, navigation, and/or timing (PNT) services by providing an absolute positioning source.

SUMMARY

The present disclosure involves computer-implemented methods and systems for geophysical fields sensing-based navigation. Examples of a geophysical field include a magnetic field and a gravitational field. One example computer-implemented method includes storing, at a navigation object, an offline baseline estimation model. Online geophysical field model data not stored on the navigation object are received at various times at the navigation object. Control logic is used to select at least one of (1) the offline baseline estimation model and (2) the online geophysical field model data to use to estimate geophysical fields for the navigation object at a variety of specified times.

The previously described implementation is implementable using a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium. The foregoing and other embodiments can each optionally include one or more of the following features, alone or in combination. In particular, one embodiment includes all the following features in combination.

In some implementations, the selecting includes selecting an ensemble of models including selecting a model from (1) the offline baseline estimation model or (2) the online geophysical field model data to estimate the geophysical fields for the navigation object at the variety of specified times.

In some implementations, selecting at least one of (1) the offline baseline estimation model and (2) the online geophysical field model data is based at least in part on connectivity status of the navigation object.

In some implementations, the connectivity status includes at least one of upload rate and random access memory status.

In some implementations, selecting at least one of (1) the offline baseline estimation model and (2) the online geophysical field model data is based at least in part on non-connectivity conditions.

In some implementations, the non-connectivity conditions includes at least one of space weather, location, time of day, and altitude.

In some implementations, the storing includes storing at least one offline specialized estimation model.

In some implementations, the at least one offline specialized estimation model includes at least one of a severe solar storm model, a lightning model, an oceanic model, a high-latitude travel model, and a shielded environment model.

In some implementations, the selecting includes selecting at a rate that is configured to avoid causing a rate of discontinuities in navigation results above a specified threshold.

In some implementations, the selecting includes retroactive navigation processing based at least in part on data received by the navigation object when connectivity is restored, the retroactive navigation processing updating an estimator for a set of past time steps to update a present position.

In some implementations, a primary field to use for navigation is determined and the selecting includes selecting a map to use for navigation.

In some implementations, model-in-use status is forwarded to a user via a graphical user interface.

In some implementations, the control logic uses status data from at least one communication system to detect when data connectivity is available, to prompt switching between using the offline baseline estimation model, the online geophysical field model data, or a combination of the offline baseline estimation model and the online geophysical field model data, or to estimate the geophysical fields for the navigation object at the variety of specified times.

In some implementations, the control logic is configured to determine connectivity status of the navigation object and to select the at least one of (1) the offline baseline estimation model and (2) the online geophysical field model data to use based at least in part on the connectivity status.

In some implementations, determining the connectivity status includes determining a bandwidth of a connectivity of the navigation object with at least one source not on the navigation object.

In some implementations, the control logic is configured to receive position and time data for the navigation object and to select the at least one of (1) the offline baseline estimation model and (2) the online geophysical field model data to use based at least in part on the connectivity status, and the position and time data for the navigation object.

In some implementations, the receiving includes receiving data via a data relay antenna and the online geophysical field model data includes geophysical field data based on near real-time measurements from geophysical monitoring services.

In some implementations, the online geophysical field model data includes data from a geophysical field prediction model that is unable to be computed at the navigation object, or geophysical data streams that are too large in size or complexity to transmit when communications bandwidth is limited.

The subject matter described in this specification can be implemented in particular embodiments so as to realize one or more of the following advantages. In some cases, the disclosed systems and methods can allow for real-time or post-processing based magnetic navigation, even in cases where a base station or other infrastructure is unavailable. The disclosed systems and methods can achieve flexibility in external geophysical field model and data source selection, enhance the removal of contaminating signals from the target geophysical field, and allow the alt-PNT system to maintain navigation functionality even when base stations are unavailable. The disclosed systems and methods can enable navigation under conditions where forecasts, e.g., weather forecasts, become unavailable during certain condition such as storms (e.g. hurricanes), by providing the user/system with automatic updates from a locally stored baseline model, perhaps as well as estimates of the errors associated with the automatic updates. The disclosed systems and methods can allow for improvement in estimation accuracy based on real-time data or available geophysical field estimation models. The disclosed systems and methods can enable alt-PNT technologies to be performed on low size, weight and power (SWaP) or computationally limited devices. The disclosed systems and methods can enable PNT devices to obtain a specific target field with reduced corruption from superposed sources of geophysical fields, even during times when data connectivity is degraded. The disclosed systems and methods can allow users to automatically select one or more geophysical field estimation models based on a set of given conditions, including geomagnetic storms or different regional conditions. The disclosed systems and methods can allow for the ability to notify users of transitions between accuracy levels of external geophysical field modeling and/or PNT solutions under different conditions.

The details of these and other aspects and implementations of the present disclosure are set forth in the accompanying drawings and the description below. Other features, objects, and advantages of the disclosure will be apparent from the description and drawings, and from the claims.

BRIEF DESCRIPTION OF DRAWINGS

Like reference numbers and designations in the various drawings indicate like elements.

DETAILED DESCRIPTION

Figure 1:
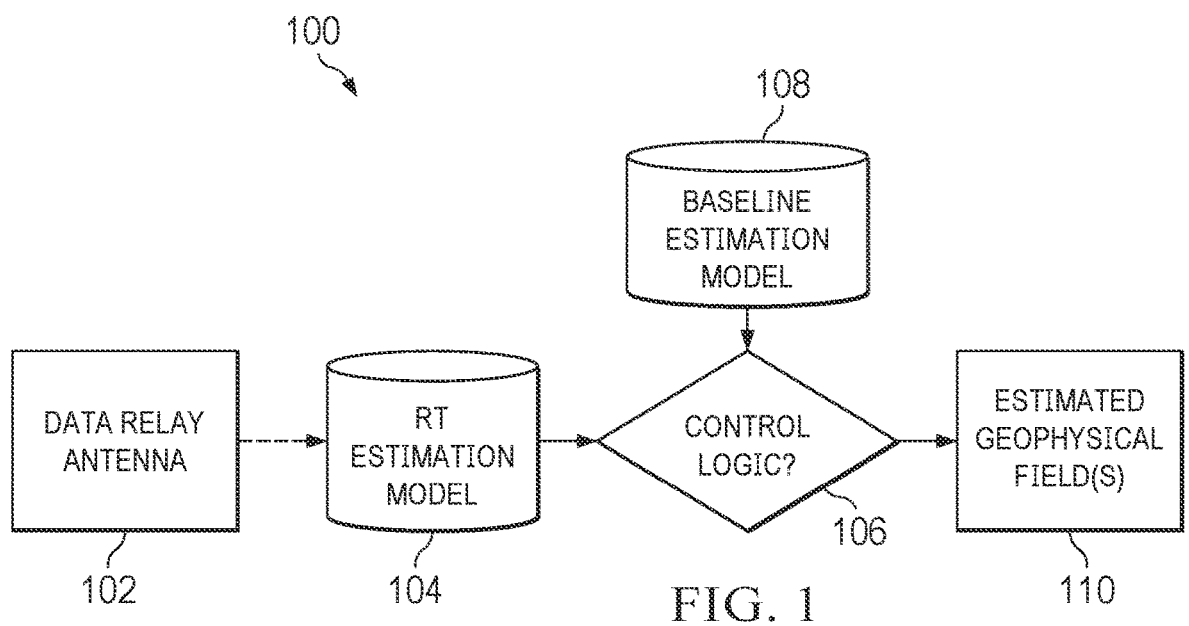
FIG. 1 illustrates an example system for estimating one or more geophysical fields at a navigation object, according to some implementations.

This disclosure relates to systems and methods for geophysical fields sensing-based navigation, e.g., estimating geophysical fields for magnetic navigation. In some cases, magnetic navigation works by matching measurements from one or more magnetic field sensors, for example, magnetometers and/or magnetic gradiometers, to a model or map of predicted magnetic field values, and can be used as a standalone technology or with other alt-PNT systems.

In some cases, a challenge with magnetic navigation is estimating the geophysical magnetic field signal(s) to be used for navigation. Magnetic fields are vector quantities, and measurements of a magnetic field include superposed fields from different sources. The sensor itself or platform where the sensor is located, for example, a vehicle or building, can generate magnetic fields. Additionally, magnetic field measurements can also contain signals due to geophysical fields. For example, the Earth system (including its interior and surface) and geospace environment are filled with various current systems and fields that interact with each other. Table 1 includes a summary of common Earth-based geophysical magnetic fields. The list in Table 1 is non-exhaustive, and future scientific discoveries may necessitate additional categories. For PNT technologies deployed beyond Earth, some geophysical magnetic fields in Table 1 may be generalized to their counterparts in other regions of space, including geophysical/astrophysical external field sources such as the interplanetary and intergalactic magnetic fields and currents from the heliopause.

TABLE 1

| Category | Field name | Source(s) | Other colloquial names |
|---|---|---|---|
| Internal | Dynamo field | Complex fluid motions in a planet, star, or other astrophysical system that give rise to a dynamo process generating a magnetic field. These may be thermal, chemical, and/or mechanical in nature. | Core fields, internal fields, planetary/stellar magnetic fields, Earth's core field |
| Anomaly | Anomaly Field | Fields arising from the locked in magnetic fields in Earth's rocks acquired from the environment as the rock cooled, metamorphosed, or underwent remnant processes. | Crustal magnetic field Geologic field Paleomagnetic field |
| External | Magnetospheric Fields | a) Magnetopause/Chapman-Ferraro current-Found along the boundary between Earth's magnetosphere and the solar wind (magnetopause). b) Ring Current-Circulates around Earth's equator within the magnetosphere. c) Magnetotail Current-Extends away from Earth's magnetosphere on the nightside, forming the tail-like region. d) Field-Aligned/Birkeland Currents-Two regions of current around both polar caps of the planet, i.e. Region 1 and Region 2 Currents that connect the magnetosphere to the ionosphere and the ring currents. | Space Weather Solar Weather See also Source(s) |
| External | Ionospheric Fields | For Earth-based Magnetospheric fields a) Pedersen Currents-Flows across the polar | Space Weather Solar Weather |

TABLE 1-continued

| Category | Field name | Source(s) | Other colloquial names |
|---|---|---|---|
| | | caps.<br>b) Hall currents-Flows perpendicular to the Pedersen currents.<br>c) Sq-Currents-Forms on the dayside<br>d) Polar/auroral electrojet-a current system in the lower E-layer of the ionosphere (~90 km-150 km) in the polar region.<br>e) equatorial electrojet-a current system in the lower E-layer of the ionosphere (~90 km-150 km) in the equatorial region. | See also Source(s) |
| External | Induced Fields | Induction response of the crust, mantle, and/or ocean, to changing external magnetic fields. | Mantle induction field |
| Referred to as Internal or External | Advected Fields/ Oceanic Fields | Distortion of a field by fluid motions. These motions may be sufficient to modify the magnetic field, but are not strong enough or in a sufficient geometry for full dynamo action. E.g., currents in Earth's Ocean will slightly shear the background field from Earth's outer core. | Ocean current field Sheared field |

In some cases, the superposition of all these fields is included in measurements of magnetic field and makes comparing the measured values to one source of field challenging. Estimating and characterizing accurate values for these various field sources that may corrupt the detection of the targeted source field/map can lead to a more accurate MagNav system.

In some cases, the disclosed systems and methods relate to a system for automatically estimating and/or removing different types of geophysical magnetic fields from measurements made by magnetic field sensors in a MagNav system, in environments where data connectivity based on methods such as internet, cellular, Bluetooth, or manual downloads/uploads, may be intermittent or unavailable. The intermittent data connectivity conditions can be conditions for alt-PNT technologies, for example, underwater vehicles or navigation during times of solar storms, when GPS satellite signals may become temporarily or permanently unavailable.

In some cases, the disclosed systems and methods can be extended to systems based on other natural sources of geophysical signals that can provide reference maps for navigation, with the benefit of improving accuracy and providing the best reference field in the region for a given time, and set of geophysical condition(s) and technological constraint(s). In some cases, a system based on other natural sources of geophysical signals can automatically switch between the different geophysical or magnetic reference signals based on inputs from an array of sensors and models that provide inputs about the accuracy of navigation, time, general region of interest, and computational performance. Based on the inputs, the system can determine the geophysical reference map to use, from a selection of core field maps, external field (ionospheric and magnetospheric) maps, induced field maps, gravity field maps, interplanetary magnetic field, and/or solar wind maps. The choice of reference map(s) consequently determines the sensors' data cadence, subtractions, smoothing, and corrections applied to the data from the sensors, and the accuracy required for navigation.

In some cases, external fields can change on daily or shorter timescales, and consequently, real-time monitoring and/or advanced simulations for full characterization of external fields may be needed. In some cases, internal magnetic fields such as Earth's core field can change at slower rates, for example, on monthly to yearly timescales, but receiving updated models may still be important for systems deployed to remote destinations for extended periods of time with no data connectivity, such as space travel or aquatic environments.

In some cases, MagNav systems may use one or more geophysical field sources in Table 1 as a reference signal/map for navigation. Fields not used to define a system's primary reference map for PNT determination then become contaminating signals, and may require removal depending upon navigation accuracy requirements. For example, for MagNav systems using crustal anomaly field maps as their primary reference map for PNT determination, internal and/or external magnetic fields in Table 1 may need to be removed from the system's sensor measurements before comparison with a magnetic field map.

Figure 2:
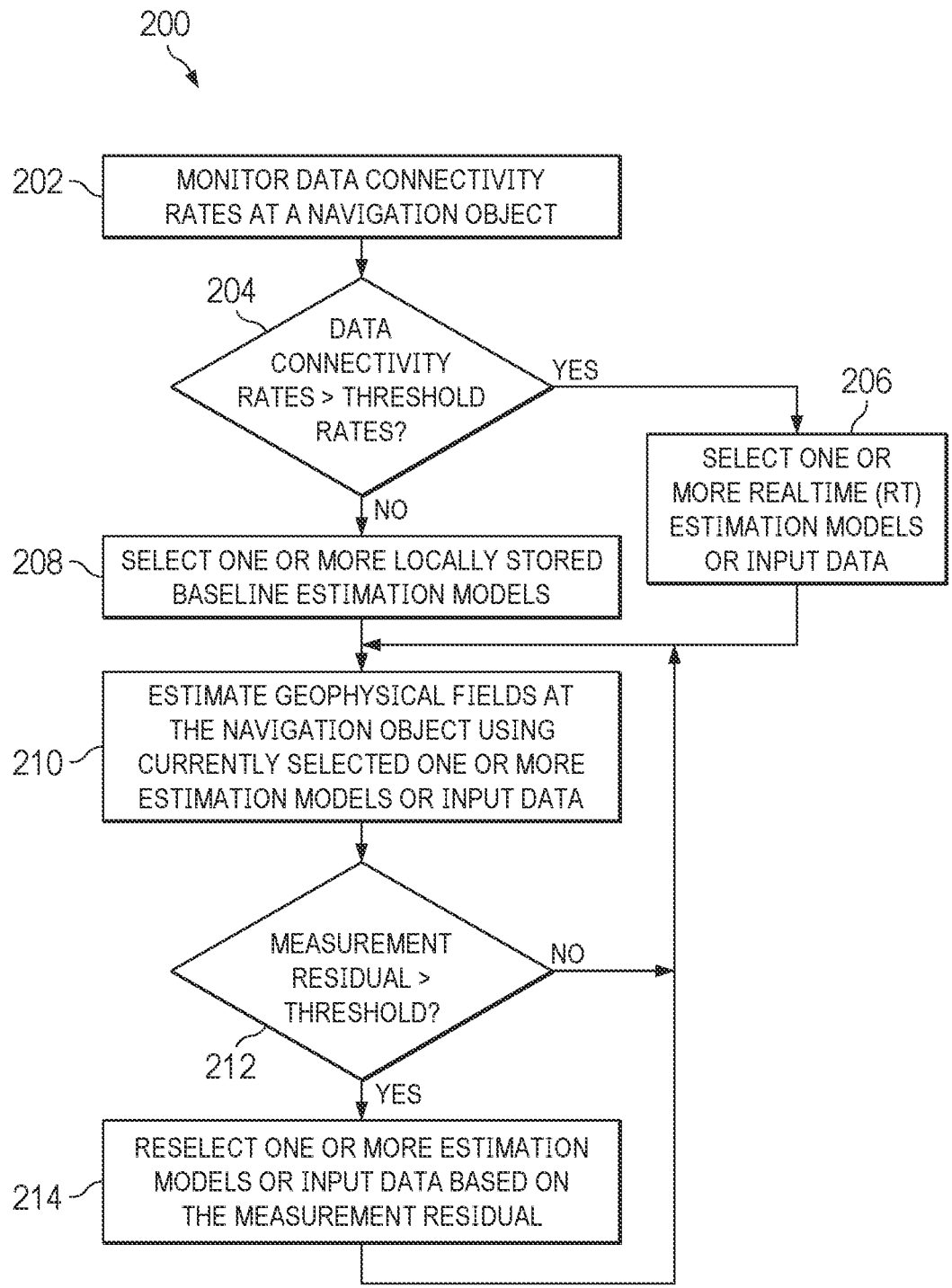
FIG. 2 illustrates an example process of control logic 106, according to some implementations.

FIG. 1 illustrates an example system 100 for estimating one or more geophysical fields at a navigation object. In some implementations, control logic 106 can use status fields from hardware systems onboard the navigation object to determine when sufficient data connectivity to data sources outside the navigation object is available at the navigation object. Based on the determined availability of data connectivity, control logic 106 can then select, between one or more baseline estimation models 108 stored locally at the navigation object and one or more online/real-time (RT) estimation models or online input data 104 received from data relay antenna 102, for estimating one or more geophysical fields 110 at the navigation object. An example of control logic 106 is shown in FIG. 2 and described later.

In some implementations, when data connectivity rates at the navigation object, for example, the uplink rate and downlink rate, are greater than their respective thresholds, the status fields from the hardware systems onboard the navigation object indicate that data connectivity is sufficiently available at the navigation object. The indication that data connectivity is available at the navigation object can prompt control logic 106 to use online/RT estimation model or online input data received from data relay antenna 102 for estimating geophysical fields at the navigation object. In this specification, online/RT estimation model(s) or online input data will also be referred to as online geophysical field model data. Online geophysical field model data can be either geophysical filed data produced by a model, or an estimation model itself or a combination of the two.

In some implementations, when either the uplink rate or the downlink rate is equal to or smaller than their respective thresholds, the status fields from the hardware systems onboard the navigation object indicate that data connectivity is not sufficiently available at the navigation object. The indication that data connectivity is not sufficiently available at the navigation object can prompt control logic 106 to use offline baseline estimation model 108 stored at the navigation object for estimating geophysical fields at the navigation object. In this specification, offline baseline estimation model (or simply baseline estimation model) refers to a variety of models including a model that processes an input to produce an output as well as lookup tables.

Therefore, when data connectivity is available at the navigation object, the alt-PNT device(s) onboard the navigation object can download results from one or more online/RT estimation models, for example, data-informed atmospheric or space weather forecasts related to geophysical fields at the navigation object, or data from computationally intensive physics simulations of conditions related to geophysical fields at the navigation object, for example, space weather. When data connectivity is lost or degraded, the alt-PNT device(s) can automatically switch to longer-term baseline models locally stored at the navigation object, which are computationally simpler and/or do not require updated data from monitoring services outside the navigation object.

In some implementations, one or more baseline estimation models 108 are available offline to the navigation object, and contain or can produce average predictions for geophysical fields experienced by a sensor as a function of time and/or location of the sensor. Example offline/baseline estimation models 108 can include spatiotemporal models of internal or external fields experienced at the navigation object. In some cases, example offline/baseline estimation models 108 can include a database of long-term predictions of geophysical model(s) informed by current or past data extended to time horizons where high accuracy of the estimated location of the navigation object is no longer expected, or simple physical models that can be calculated on small, Size Weight and Power (SWaP)-limited PNT devices.

In some implementations, one or more online/RT estimation models or input data 104 can include one or more forecasted or live models that use updated measurements received from geophysical field monitoring services. An example of data source ingested by the one or more forecasted or live models can include aerial/aquatic ground-based systems, for example, telescopes or other sensors/detectors, or spacecraft, that monitor solar/stellar wind conditions, external current systems, particle fluxes, solar/stellar cycle position, sunspots, ionospheric/magnetospheric conditions, or related observation types.

In some implementations, an example of a data source ingested by the one or more forecasted or live models can include magnetic sensor data collection services, for example, ground-based geomagnetic observatories, space based and virtual geomagnetic observatories, or distributed measurements such as mobile device measurements.

In some implementations, an example of a data source ingested by the one or more forecasted or live models can include climate or ocean monitoring systems that monitor multiple parameters, for example, density, conductivity/salinity, sea surface height, fluid current systems, or temperature.

In some implementations, one or more online/RT estimation models or input data 104 can include models that are too computationally intensive to be calculated on SWaP-limited PNT devices. For example, the computational power of a SWaP-limited PNT device may be less than tens of tera floating-point operations per second (FLOPS), and the random access memory (RAM) of a SWaP-limited PNT device may be less than hundreds of gigabytes. In some cases, some external fields can be characterized and calculated using complex magnetohydrodynamic and plasma kinematic models with large supercomputers. These physics-based models can incorporate many numerically intensive steps that simulate the physical effects of multiple factors on external fields, and consequently can represent more realistic models of external fields, but cannot be calculated in a reasonable timeframe with a SWaP-limited device onboard the navigation object and used to generate magnetic navigation solutions.

In some implementations, one or more online/RT estimation models or online input data 104 can include input data that are input to the one or more baseline estimation models 108 stored locally at the navigation object. Because the online input data can have large size beyond the storage capacity of the navigation object, the input data can be obtained using data relay antenna 102 when data connectivity is available at the navigation object.

In some implementations, system 100 can include one or more models for specialized or unusual conditions, for example, severe solar storms, lightning, oceanic or high-latitude travel, or shielded environments. In some cases, some of the one or more models for specialized or unusual conditions may have sizes small enough so that they can be stored locally in the navigation object. In some cases, some of the one or more models for specialized or unusual conditions can be received by data relay antenna 102 when data connectivity is available at the navigation object.

In some implementations, control logic 106 can control at what rate to determine the connectivity status of the navigation object.

FIG. 2 illustrates an example process 200 of control logic 106. For convenience, control logic 106 will be described as being performed by a system of one or more computers, located in one or more locations, and programmed appropriately in accordance with this specification.

At 202, a computer system monitors data connectivity rates at a navigation object. In some implementations, the data connectivity rates can include the uplink rate and downlink rate at the navigation object. The monitoring operation at 202 can be performed regularly at multiple time instants, for example, according to a predetermined schedule. In some cases, control logic 106 can determine at what rate to perform the monitoring operation at 202.

At 204, the computer system determines if each of the data connectivity rates is greater than a respective threshold rate, e.g., greater than a predetermined threshold rate. If each of the data connectivity rates is greater than the threshold rate, the computer system selects one or more RT estimation models or input data 104 at 206, then proceeds to 210. Otherwise, the computer system selects one or more locally stored baseline estimation models 108 at 208, then proceeds to 210.

At 210, the computer system estimates geophysical fields at the navigation object using currently selected one or more estimation models or input data from either 104 or 108.

At 212, the computer system determines if the measurement residual calculated from the differences between the geophysical fields 110 estimated at 210 and corresponding geophysical field map values is greater than a threshold, e.g., a predetermined threshold. If the measurement residual is greater than the threshold, the computer system reselects one or more estimation models or input data based on the measurement residual at 214, and then proceeds to 210. If the measurement residual is not greater than the threshold, the computer system proceeds to 210 to continue the estimation of the geophysical fields at the navigation object, using the currently selected one or more estimation models or input data from either 104 or 108.

Figure 3:
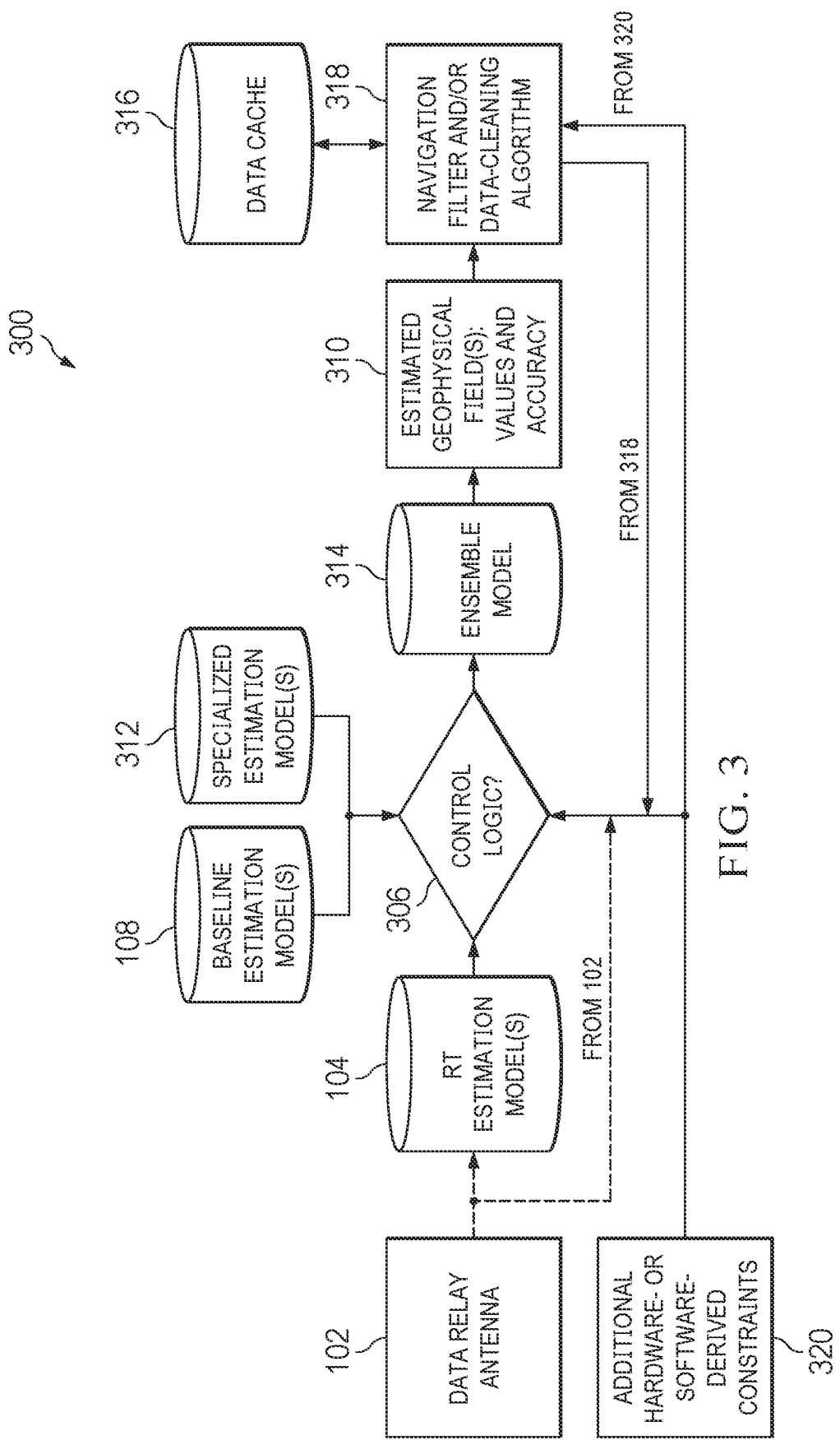
FIG. 3 illustrates another example system for estimating one or more geophysical fields at a navigation object, according to some implementations.

FIG. 3 illustrates another example system 300 for estimating one or more geophysical fields at a navigation object. In some implementations, both system 100 and system 300 include data relay antenna 102, one or more online/RT estimation models or online input data 104, and one or more offline/baseline estimation models 108. System 300 can also include additional components, for example, one or more specialized estimation models 312, an ensemble model 314, data cache 316, additional hardware or software derived constraints 320, and navigation filter and/or data-cleaning algorithm 318. In some cases, in addition to the functions of control logic described in FIG. 2, control logic 306 can also include additional functions that interact with the additional components listed above.

In some implementations, additional hardware or software derived constraints 320 can include additional hardware-derived fields/sensors or software-derived position estimates of the navigation object that can be used to prompt control logic 306 to use one of the one or more online/RT estimation models or online input data 104, the one or more baseline estimation models 108, or one or more specialized estimation models 312 to estimate geophysical fields and their associated accuracy 310. For example, in some cases, either a large reading on an electric or magnetic field sensor in the hardware system, e.g., 100 nT in the magnitude of the difference between the magnetic field measurement and an existing quiet-time reference field model onboard the navigation object, or large readouts of the solar-wind parameters and/or planetary Kp-index received from other sources outside the navigation object and indicating which reference model to use, can trigger a switch to a model optimized for geomagnetic storms of a specific strength. In some cases, an estimate of local time from a navigation filter (e.g. a Kalman filter) can be used to improve input for characterizing the external fields from various models. In some cases, a software-defined radio (SDR) can improve analysis of data connectivity states at the navigation object.

In some implementations, control logic 306 can provide the ability to update automatically the estimated errors in the geophysical field modeling as well as the overall alt-PNT solution of the navigation object, given conditions of degraded field monitoring update capabilities, for example, degraded data connectivity. Control logic 306 can also provide the ability to switch between different estimation models among the one or more online/RT estimation models or online input data 104, the one or more baseline estimation models 108, and/or one or more specialized estimation models 312. Such switching can occur even in benign, full-connectivity conditions, if there are transitions between regimes, locations, or environmental conditions where one estimation model outperforms another estimation model.

In some implementations, control logic 306 can switch between external field models. Such switches can include switches of the geophysical field models themselves depending on the availability of data connectivity at the navigation object. Similarly, there can be switches in the estimated errors of a chosen geophysical field model when data connectivity is not available and consequently continued data from outside the navigation object is no longer available for forecast updates.

In some implementations, control logic 306 can switch between geophysical field estimation models, including switches that are smoothly blended (rather than abrupt) or coordinated more holistically in the form of an ensemble model 314, which includes multiple available estimation models that can be used to estimate the geophysical fields and the accuracy of the estimated geophysical fields 310. In some cases, the number of available estimation models or the accuracy of each estimation model may change as a function of time, location of the navigation object, or conditions at the navigation object.

In some implementations, control logic 306 can include a feedback loop with navigation filter and/or data-cleaning algorithm 318. This feedback loop can be used to revise the estimated past and present states in the navigation filter when improved online/RT estimation models or online input data 104 from outside the navigation object is finally received after data connectivity becomes available. For example, if data connectivity at the navigation object is lost, control logic 306 can select a baseline estimation model 108 that is computationally efficient (but may be less accurate) for estimating geophysical fields at the navigation object. Once data connectivity restores, improved geophysical field data from online/RT estimation models or online input data 104 may become available for past time epochs during the original period of reduced or lost data connectivity. Control logic 306 may then be used in combination with the navigation filter and/or data cleaning algorithms to re-evaluate past navigation filter estimates and improve the accuracy of current navigation filter estimates. To enable the operations of the feedback loop described above, data cache 316 can be used to store past data, modeled information, and/or states, as shown in FIG. 3.

Figure 4:
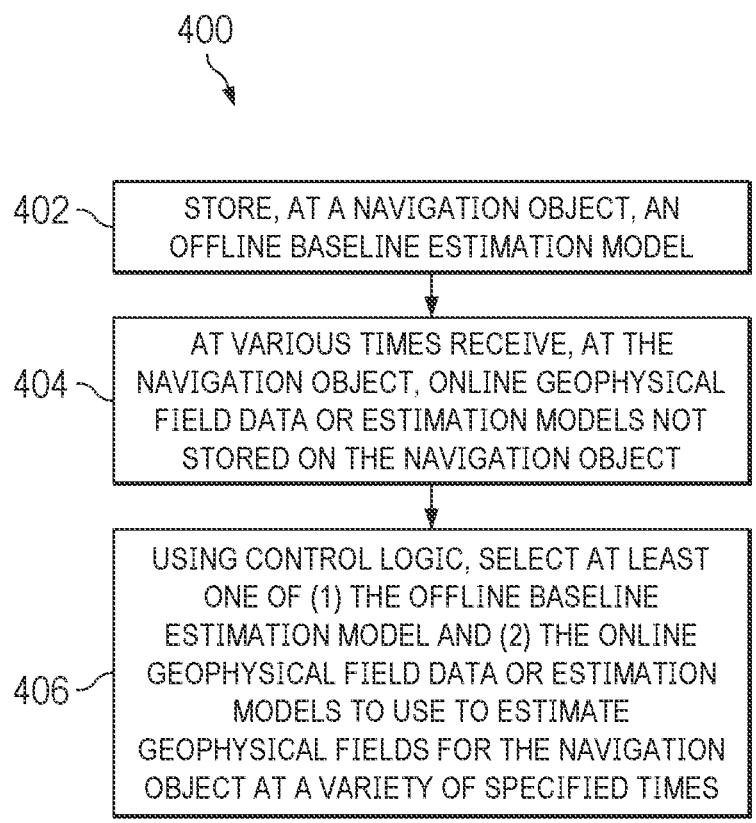
FIG. 4 illustrates an example process for estimating geophysical fields for magnetic navigation, according to some implementations.

FIG. 4 illustrates an example process 400 for estimating geophysical fields for magnetic navigation. For convenience, process 400 will be described as being performed by a computer system having one or more computers located in one or more locations and programmed appropriately in accordance with this specification. An example of the computer system is computer system 500 illustrated in FIG. 5.

At 402, a computer system stores, at a navigation object, an offline baseline estimation model.

At 404, the computer system receives, at various times and at the navigation object, online geophysical field model data not stored on the navigation object.

At 406, the computer system uses control logic to select at least one of (1) the offline baseline estimation model and (2) the online geophysical field model data to use to estimate geophysical fields for the navigation object at a variety of specified times.

Figure 5:
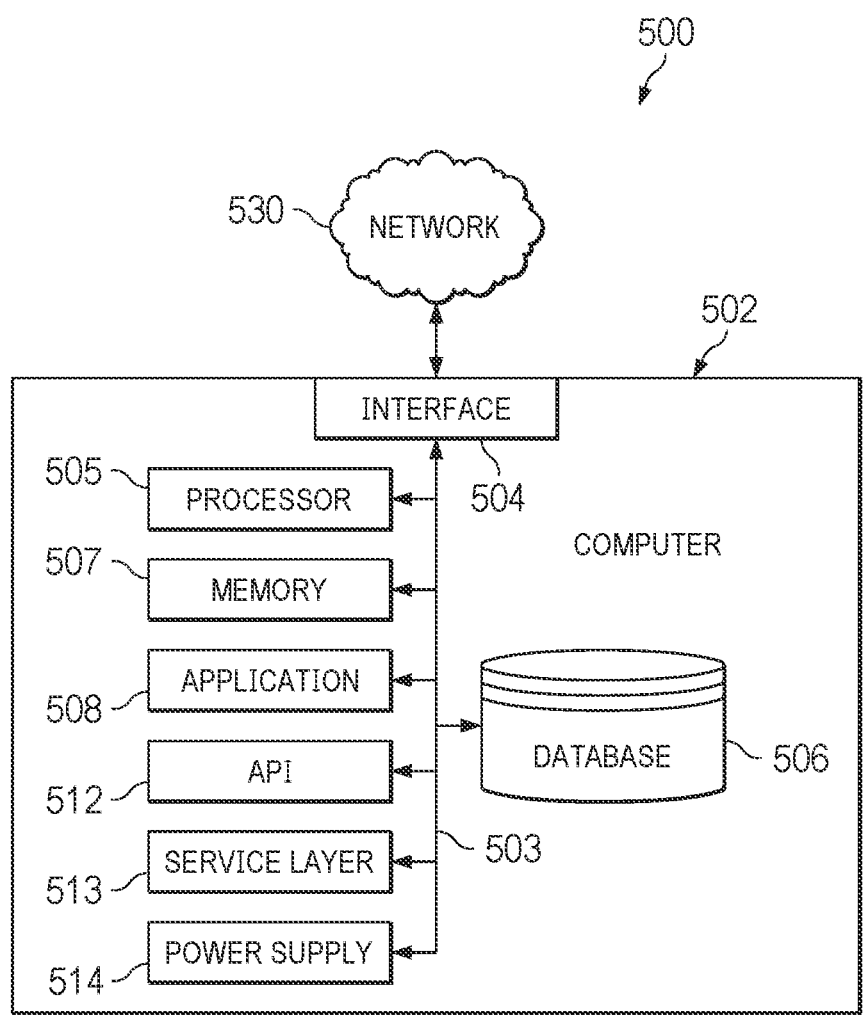
FIG. 5 is a block diagram of an example computer system that can be used to provide computational functionalities associated with described algorithms, methods, functions, processes, flows, and procedures, according to some implementations.

FIG. 5 is a block diagram of an example computer system 500 that can be used to provide computational functionalities associated with described algorithms, methods, functions, processes, flows, and procedures, according to some implementations. In some implementations, the computer system performing process 200 or 400 can be the computer system 500 or the computer 502, include the computer system 500 or the computer 502, or the computer system performing process 200 or 400 can communicate with the computer system 500.

The illustrated computer 502 is intended to encompass any computing device such as a server, a desktop computer, an embedded computer, a laptop/notebook computer, a wireless data port, a smart phone, a personal data assistant (PDA), a tablet computing device, or one or more processors within these devices, including physical instances, virtual instances, or both. The computer 502 can include input devices such as keypads, keyboards, and touch screens that can accept user information. Also, the computer 502 can include output devices that can convey information associated with the operation of the computer 502. The information can include digital data, visual data, audio information, or a combination of information. The information can be presented in a graphical user interface (UI) (or GUI). In some implementations, the inputs and outputs include display ports (such as DVI-I+2× display ports), USB 3.0, GbE ports, isolated DI/O, SATA-III (6.0 Gb/s) ports, mPCIe slots, a combination of these, or other ports. In instances of an edge gateway, the computer 502 can include a Smart Embedded Management Agent (SEMA), such as a built-in ADLINK SEMA 2.2, and a video sync technology, such as Quick Sync Video technology supported by ADLINK MSDK+. In some examples, the computer 502 can include the MXE-5400 Series processor-based fanless embedded computer by ADLINK, though the computer 502 can take other forms or include other components.

The computer 502 can serve in a role as a client, a network component, a server, a database, a persistency, or components of a computer system for performing the subject matter described in the present disclosure. The illustrated computer 502 is communicably coupled with a network 530. In some implementations, one or more components of the computer 502 can be configured to operate within different environments, including cloud-computing-based environments, local environments, global environments, and combinations of environments.

At a high level, the computer 502 is an electronic computing device operable to receive, transmit, process, store, and manage data and information associated with the described subject matter. According to some implementations, the computer 502 can also include, or be communicably coupled with, an application server, an email server, a web server, a caching server, a streaming data server, or a combination of servers.

The computer 502 can receive requests over network 530 from a client application (for example, executing on another computer 502). The computer 502 can respond to the received requests by processing the received requests using software applications. Requests can also be sent to the computer 502 from internal users (for example, from a command console), external (or third) parties, automated applications, entities, individuals, systems, and computers.

Each of the components of the computer 502 can communicate using a system bus 503. In some implementations, any or all of the components of the computer 502, including hardware or software components, can interface with each other or the interface 504 (or a combination of both), over the system bus. Interfaces can use an application programming interface (API) 512, a service layer 513, or a combination of the API 512 and service layer 513. The API 512 can include specifications for routines, data structures, and object classes. The API 512 can be either computer-language independent or dependent. The API 512 can refer to a complete interface, a single function, or a set of APIs 512.

The service layer 513 can provide software services to the computer 502 and other components (whether illustrated or not) that are communicably coupled to the computer 502. The functionality of the computer 502 can be accessible for all service consumers using this service layer 513. Software services, such as those provided by the service layer 513, can provide reusable, defined functionalities through a defined interface. For example, the interface can be software written in JAVA, C++, or a language providing data in extensible markup language (XML) format. While illustrated as an integrated component of the computer 502, in alternative implementations, the API 512 or the service layer 513 can be stand-alone components in relation to other components of the computer 502 and other components communicably coupled to the computer 502. Moreover, any or all parts of the API 512 or the service layer 513 can be implemented as child or sub-modules of another software module, enterprise application, or hardware module without departing from the scope of the present disclosure.

The computer 502 can include an interface 504. Although illustrated as a single interface 504 in FIG. 5, two or more interfaces 504 can be used according to particular needs, desires, or particular implementations of the computer 502 and the described functionality. The interface 504 can be used by the computer 502 for communicating with other systems that are connected to the network 530 (whether illustrated or not) in a distributed environment. Generally, the interface 504 can include, or be implemented using, logic encoded in software or hardware (or a combination of software and hardware) operable to communicate with the network 530. More specifically, the interface 504 can include software supporting one or more communication protocols associated with communications. As such, the network 530 or the interface's hardware can be operable to communicate physical signals within and outside of the illustrated computer 502.

The computer 502 includes a processor 505. Although illustrated as a single processor 505 in FIG. 5, two or more processors 505 can be used according to particular needs, desires, or particular implementations of the computer 502 and the described functionality. Generally, the processor 505 can execute instructions and manipulate data to perform the operations of the computer 502, including operations using algorithms, methods, functions, processes, flows, and procedures as described in the present disclosure.

The computer 502 can also include a database 506 that can hold data for the computer 502 and other components connected to the network 530 (whether illustrated or not). For example, database 506 can be an in-memory, conventional, or a database storing data consistent with the present disclosure. In some implementations, the database 506 can be a combination of two or more different database types (for example, hybrid in-memory and conventional databases) according to particular needs, desires, or particular implementations of the computer 502 and the described functionality. Although illustrated as a single database 506 in FIG. 5, two or more databases (of the same, different, or combination of types) can be used according to particular needs, desires, or particular implementations of the computer 502 and the described functionality. While database 506 is illustrated as an internal component of the computer 502, in alternative implementations, database 506 can be external to the computer 502.

The computer 502 also includes a memory 507 that can hold data for the computer 502 or a combination of components connected to the network 530 (whether illustrated or not). Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507 in FIG. 5, two or more memories 507 (of the same, different, or combination of types) can be used according to particular needs, desires, or particular implementations of the computer 502 and the described functionality. While memory 507 is illustrated as an internal component of the computer 502, in alternative implementations, memory 507 can be external to the computer 502.

An application 508 can be an algorithmic software engine providing functionality according to particular needs, desires, or particular implementations of the computer 502 and the described functionality. For example, an application 508 can serve as one or more components, modules, or applications 508. Multiple applications 508 can be implemented on the computer 502. Each application 508 can be internal or external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion and management circuits, including recharging, standby, and power management functionalities. In some implementations, the power-supply 514 can include a power plug to allow the computer 502 to be plugged into a wall socket or a power source to, for example, power the computer 502 or recharge a rechargeable battery.

There can be any number of computers 502 associated with, or external to, a computer system including computer 502, with each computer 502 communicating over network 530. Further, the terms "client", "user", and other appropriate terminology can be used interchangeably without departing from the scope of the present disclosure. Moreover, the present disclosure contemplates that many users can use one computer 502 and one user can use multiple computers 1202.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   storing, at a navigation object, an offline baseline estimation model;
   at various times receiving, at the navigation object, online geophysical field model data not stored on the navigation object; and
   using control logic, selecting at least one of (1) the offline baseline estimation model and (2) the online geophysical field model data to use to estimate geophysical fields for the navigation object at a variety of specified times, wherein the selecting comprises reselecting, based on a comparison between a threshold and a measurement residual determined from the estimated geophysical fields, at least one estimation model from (1) the offline baseline estimation model or (2) the online geophysical field model data to estimate the geophysical fields.

2. The method of claim 1, wherein the selecting comprises selecting an ensemble of models including selecting a model from (1) the offline baseline estimation model or (2) the online geophysical field model data to estimate the geophysical fields for the navigation object at the variety of specified times.

3. The method of claim 1, wherein selecting at least one of (1) the offline baseline estimation model and (2) the online geophysical field model data is based at least in part on connectivity status of the navigation object.

4. The method of claim 3, wherein the connectivity status comprises at least one of upload rate and random access memory status.

5. The method of claim 1, wherein selecting at least one of (1) the offline baseline estimation model and (2) the online geophysical field model data is based at least in part on non-connectivity conditions.

6. The method of claim 5, wherein the non-connectivity conditions comprise at least one of space weather, location, time of day, and altitude.

7. The method of claim 1, wherein the storing comprises storing at least one offline specialized estimation model.

8. The method of claim 7, wherein the at least one offline specialized estimation model comprises at least one of a severe solar storm model, a lightning model, an oceanic model, a high-latitude travel model, and a shielded environment model.

9. The method of claim 1, wherein the selecting comprises selecting at a rate that is configured to avoid causing a rate of discontinuities in navigation results above a specified threshold.

10. The method of claim 1, wherein the selecting comprises retroactive navigation processing based at least in part on data received by the navigation object when connectivity to receive the online geophysical field model data is restored, the retroactive navigation processing updating an estimator for a set of past time steps to update a present position.

11. The method of claim 1, wherein the method comprises determining a primary field to use for navigation and the selecting comprises selecting a map to use for navigation.

12. The method of claim 1, wherein the method further comprises forwarding model-in-use status to a user via a graphical user interface.

13. The method of claim 1, wherein the control logic uses status data from at least one communication system to detect when data connectivity is available, to prompt switching between using the offline baseline estimation model, the online geophysical field model data, or a combination of the offline baseline estimation model and the online geophysical field model data, to estimate the geophysical fields for the navigation object at the variety of specified times.

14. The method of claim 1, wherein the control logic is configured to determine connectivity status of the navigation object and to select the at least one of (1) the offline baseline estimation model and (2) the online geophysical field model data to use based at least in part on the connectivity status.

15. The method of claim 14, wherein determining the connectivity status comprises determining a bandwidth of a connectivity of the navigation object with at least one source not on the navigation object.

16. The method of claim 15, wherein the control logic is configured to receive position and time data for the navigation object and to select the at least one of (1) the offline baseline estimation model and (2) the online geophysical field model data to use based at least in part on the connectivity status, and the position and time data for the navigation object.

17. The method of claim 1, wherein the receiving comprises receiving data via a data relay antenna and wherein the online geophysical field model data comprises geophysical field data based on near real-time measurements from geophysical monitoring services.

18. The method of claim 1, wherein the online geophysical field model data comprises data from a geophysical field prediction model that is unable to be computed at the navigation object, or geophysical data streams that are too large in size or complexity to transmit when communications bandwidth is limited.

19. A non-transitory computer-readable medium storing one or more instructions executable by a computer system to perform operations comprising:

storing, at a navigation object, an offline baseline estimation model;

at various times receiving, at the navigation object, online geophysical field model data not stored on the navigation object; and using control logic, selecting at least one of (1) the offline baseline estimation model and (2) the online geophysical field model data to use to estimate geophysical fields for the navigation object at a variety of specified times, wherein the selecting comprises reselecting, based on a comparison between a threshold and a measurement residual determined from the estimated geophysical fields, at least one estimation model from (1) the offline baseline estimation model or (2) the online geophysical field model data to estimate the geophysical fields.

20. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

storing, at a navigation object, an offline baseline estimation model;

at various times receiving, at the navigation object, online geophysical field model data not stored on the navigation object; and using control logic, selecting at least one of (1) the offline baseline estimation model and (2) the online geophysical field model data to use to estimate geophysical fields for the navigation object at a variety of specified times, wherein the selecting comprises reselecting, based on a comparison between a threshold and a measurement residual determined from the estimated geophysical fields, at least one estimation model from (1) the offline baseline estimation model or (2) the online geophysical field model data to estimate the geophysical fields.

* * * * *